United States Patent
Thompson (10) Patent No.: US 8,551,603 B2
(45) Date of Patent: Oct. 8, 2013

(54) SEALED SWITCHABLE GLAZING

(75) Inventor: James Robert Thompson, Leamington Spa (GB)

(73) Assignee: Pilkington Group Limited, St Helens, Merseyside (GB)

( * ) Notice: Subject to any disclaimer, the term of this patent is extended or adjusted under 35 U.S.C. 154(b) by 416 days.

(21) Appl. No.: 12/999,487

(22) PCT Filed: Jun. 17, 2009

(86) PCT No.: PCT/GB2009/050686
§ 371 (c)(1),
(2), (4) Date: Feb. 17, 2011

(87) PCT Pub. No.: WO2009/153593
PCT Pub. Date: Dec. 23, 2009

(65) Prior Publication Data
US 2011/0171443 A1   Jul. 14, 2011

(30) Foreign Application Priority Data

Jun. 17, 2008  (GB) .................................. 0811058.7

(51) Int. Cl.
*B32B 7/02*   (2006.01)
(52) U.S. Cl.
USPC ........ 428/192; 428/195.1; 428/201; 428/204; 428/207
(58) Field of Classification Search
None
See application file for complete search history.

(56) References Cited

U.S. PATENT DOCUMENTS

| 5,111,329 | A | 5/1992 | Gajewski et al. |
| 5,408,353 | A | 4/1995 | Nichols et al. |
| 5,429,850 | A | 7/1995 | Held |
| 6,055,088 | A | 4/2000 | Fix et al. |
| 7,361,252 | B2 * | 4/2008 | Slovak et al. ................. 156/285 |
| 8,218,224 | B2 * | 7/2012 | Kwak et al. .................... 359/265 |
| 2004/0061920 | A1 | 4/2004 | Tonar et al. |

(Continued)

FOREIGN PATENT DOCUMENTS

| DE | 20 2004 001 010 U1 | 2/2005 |
| DE | 10 2004 062 770 A1 | 6/2006 |

(Continued)

OTHER PUBLICATIONS

Great Britain Search Report dated Oct. 15, 2008, issued by the UK Intellectual Property Office in corresponding Great Britain Patent Application No. GB0811058.7. (1 page).
International Search Report (PCT/ISA/210) issued on Sep. 24, 2009, by Great Britain Patent Office as the International Searching Authority for International Application No. PCT/GB2009/050686.

*Primary Examiner* — Mark Ruthkosky
*Assistant Examiner* — Christopher Polley
(74) *Attorney, Agent, or Firm* — Buchanan Ingersoll & Rooney PC (57) ABSTRACT

The invention discloses a functional film assembly comprising a functional film having at least one active layer laminated between first and second planar electrode layers. At least a portion of the edge region of the functional film is sealed by a sealing member. Preferably, the sealing member comprises a strip of polymer film material having on one surface a first strip-like region of adhesive material adjacent a first edge of the strip of polymer film material, and a second strip-like region of adhesive material adjacent a second edge of the strip of polymer film material. There is an adhesive-free region between the first and second strip-like regions of adhesive material, which is positioned coincident with the active layer of the functional film.

19 Claims, 6 Drawing Sheets

(56) References Cited

U.S. PATENT DOCUMENTS

| | | |
|---|---|---|
| 2007/0152956 A1 | 7/2007 | Danner et al. |
| 2008/0018980 A1 | 1/2008 | Niepmann et al. |
| 2009/0176101 A1 | 7/2009 | Greenall et al. |
| 2010/0014162 A1 | 1/2010 | Bunde et al. |
| 2011/0267673 A1* | 11/2011 | Agrawal et al. ............... 359/267 |

FOREIGN PATENT DOCUMENTS

| | | |
|---|---|---|
| WO | WO 2005/070666 A1 | 8/2005 |
| WO | WO 2005/102688 A2 | 11/2005 |
| WO | WO 2007/122428 A1 | 11/2007 |
| WO | WO 2007/122429 A1 | 11/2007 |

* cited by examiner

SEALED SWITCHABLE GLAZING

The present invention relates to a vehicle glazing comprising a switchable film, in particular a switchable film having edges sealed by a sealing member.

Vehicle glazings comprising a switchable film, such as a suspended particle device ("SPD") functional film or a liquid crystal ("LCD") functional film have become increasingly popular in recent times. Such glazings offer a vehicle occupant the ability to vary the transmission of light into the vehicle through the glazing, enabling the provision of large area glazings within a vehicle without the need for blinds or other means to limit or vary light transmission on sunny days. Other electrically actuated functional films are known.

Figure 1:
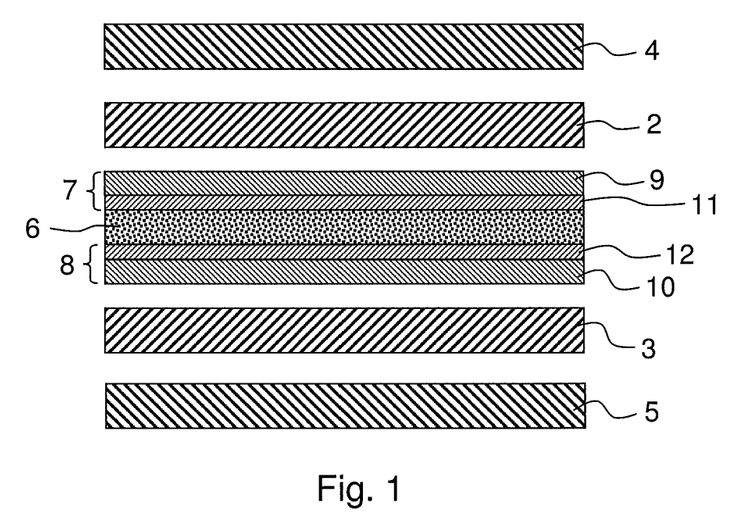
FIG. 1 (referred to above) is a schematic exploded cross-section of a laminated vehicle glazing comprising a functional film.

Functional films are included within a vehicle glazing 1 by lamination between a pair of adhesive interlayer films 2, 3, such as polyvinyl butyral films (PVB) or ethylene vinyl acetate co-polymer films (EVA), which serve to bond the functional film to two outer plies of glass, 4, 5, forming a laminated structure. The functional films (both SPD and LCD) typically comprise an active layer 6, which contains a suspended particle or liquid crystal emulsion, which is itself laminated between two planar electrode layers 7, 8. Each electrode layer comprises a ply of a plastics material 9, 10, usually polyethylene terephthalate (PET), which has an electrically conductive coating deposited on one surface thereof 11, 12. Preferably, such coatings are formed from indium tin oxide, or ITO. The electrically conductive coatings contact the active layer, allowing current to be passed via external connections to switch the functional film. SPD films suitable for use in glazings are available under licence from Research Frontiers Inc., 240 Crossways Park Drive, Woodbury, N.Y. 11797 USA, and LCD films suitable for use in glazings are available under the name UMU from Nippon Sheet Glass Co., Ltd., Sumitomo Fudosan Mita Twin Bldg. West Wing, 5-27, Mita 3-Chome, Minato-ku, Tokyo, 108-6321 Japan.

When such functional films are included within a laminated glazing, care needs to be taken in the choice of adhesive interlayer film used to bond the glazing components together. Both suspended particle and liquid crystal emulsions are prone to damage by the migration of the plasticizer components used within some adhesive interlayer films, such as PVB. Such damage is evident in that regions around the periphery of the functional film appear to begin to switch differently to the main body of the film over time, giving a poor aesthetic appearance. This problem is discussed in WO2007/122429 (in relation to LCD functional films) and WO2007/122428 (in relation to SPD functional films). Both of these documents propose the use of a plasticizer-free or low-plasticizer content adhesive interlayer film, thus preventing the ingress of mobile plasticizer components into the active layer emulsion, and removing the cause of the observed damage.

However, whilst this solution removes the source of the problem, it is not always preferable to form a laminated glazing with a plasticizer-free or low-plasticizer interlayer. One alternative approach is to use a barrier layer to physically prevent the ingress of any plasticizer components into the active layer, regardless of the adhesive interlayer material used in the glazing structure. This is the approach taken in WO2005/102688, which describes the use of an inert material, such as Mylar®, positioned between the layers of adhesive interlayer film and an SPD film. This may be in the form of a frame or other strip-like material placed on either side of the SPD film.

One disadvantage of the glazing structure disclosed in WO2005/102688 is that the Mylar® material is positioned only around the periphery of the SPD film, creating a local variation of thickness within the final laminated glazing, which can be the source of stress leading to breakage or delamination of the glazing in use. Also, the Mylar® film arrangement does not cover the edge of the actual SPD film, making it less satisfactory than the picture frame method used in WO2007/122429 and WO2007/122428.

It is therefore desirable to be able to provide a solution to the issue of functional film damage for any type of interlayer, whilst avoiding the disadvantages of the prior art approach.

The present invention aims to address these problems by providing a functional film assembly comprising a functional film having at least one active layer laminated between first and second planar electrode layers, at least a portion of the edge region of the functional film being sealed by a sealing member, wherein the sealing member comprises a strip of polymer film material having on one surface a first strip-like region of adhesive material adjacent a first edge of the strip of polymer film material, and a second strip-like region of adhesive material adjacent a second edge of the strip of polymer film material, there being an adhesive-free region between the first strip-like region of adhesive material and the second strip-like region of adhesive material, and the adhesive-free region is positioned coincident with the active layer of the functional film.

By providing an adhesive-free region in contact with the active layer of a functional film it is possible to prevent the ingress of components from an adhesive interlayer used to subsequently laminate the functional film within a vehicle glazing.

Preferably the first strip-like region of adhesive material is physically separate from the second strip-like region of adhesive material. This has the advantage of providing a simple structure for the sealing member.

Preferably the first strip-like region of adhesive material and the second strip-like region of adhesive material are substantially continuous and the adhesive-free region is physically separate from the strip of polymer film. This has the advantage that a variety of differently configured adhesive-free regions may be produced from a strip of polymer film material of certain dimensions.

Preferably, the first strip of adhesive material contacts the first planar electrode layer of the functional film, and the second strip of adhesive material contacts the second planar electrode layer.

In a preferred embodiment, the first strip-like region of adhesive material is supported on a first support film, and the strip of polymer film material is joined to the first planar electrode layer via the first strip-like region of adhesive material. Preferably the second strip-like region of adhesive material is supported on a second support film, and the strip of polymer film material is connected to the second planar electrode layer via the second strip-like region of adhesive material.

Preferably, the first and second strips of adhesive material are formed from a pressure-sensitive adhesive.

The active layer may contain a suspended particle emulsion. Alternatively, the active layer may contain a liquid crystal emulsion.

The invention also provides a laminated vehicle glazing comprising such a functional film assembly laminated between a first and a second ply of a transparent glazing material by means of at least a first and a second ply of adhesive interlayer material.

Preferably, the functional film is framed within a ply of adhesive interlayer material in an inset region, and laminated between the first and second plies of adhesive interlayer material. In this case, preferably the adhesive interlayer material is polyvinyl butyral.

The invention will now be described by way of example only, and with reference to the accompanying drawings, in which.

The present invention proposes an alternative approach to preventing plasticizer migration into functional films laminated within vehicle glazings, useful in particular with suspended particle device films, which are in general softer than liquid crystal films, and therefore require different processing. However, the present invention may also be used in conjunction with liquid crystal films, as an alternative to the crimping process commonly used to seal along the edges of such films before incorporation into a laminated glazing.

Figure 2:
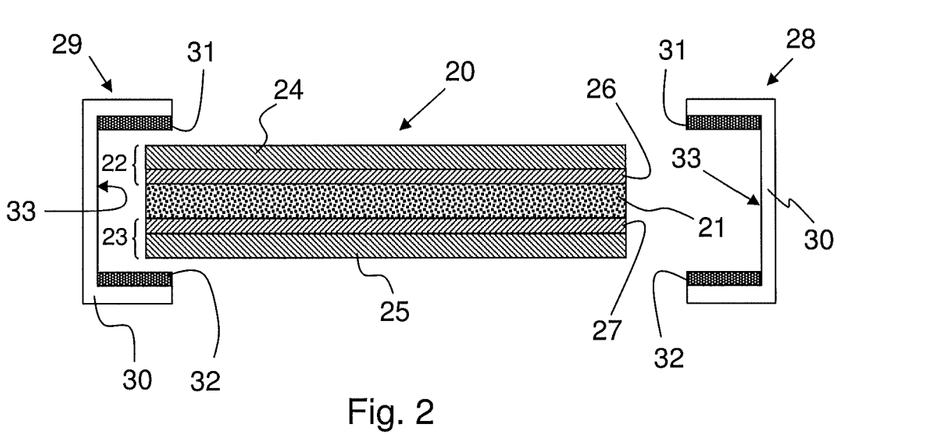
FIG. 2 is a schematic cross-section of a functional film having a sealing member in accordance with the present invention.

FIG. 2 is a schematic cross-section of a functional film having a sealing member in accordance with the present invention. In this example, the functional film 20 is a suspended particle device, and comprises and active layer 21 (containing a suspended particle emulsion) laminated between two planar electrode layers 22, 23. Each planar electrode layer 22, 23, comprises a PET substrate 24, 25, having an electrically conductive ITO layer 26, 27 deposited thereon. This electrically conductive layer 26, 27 covers substantially all of one surface of each of the plies of PET 24, 25, and remains in contact with the surface of the active layer 21. Each exposed edge of the functional film 20 is covered by a sealing member 28, 29, which seals the active layer 21, preventing both material from entering the active layer 21 and from leaving the active layer 21. For clarity, the sealing members 28, 29 are shown in a displaced position relative to the functional film 20. The sealing member 28, 29 comprises a strip of polymer film material in the form of a tape (shown in more detail in FIG. 3) formed from a PET film 30, provided with two strips of adhesive 31, 32 positioned adjacent each edge, defining an adhesive-free region 33 positioned centrally along at least a portion of the length of the sealing member. That is, there is an adhesive-free region between the first strip of adhesive 31 and the second strip of adhesive 32. The adhesive-free region contacts the edge of the active layer, and being adhesive-free, contains no plasticizer components that can migrate into the active layer 21, damaging the suspended particle emulsion. The adhesive strips 31, 32 are not in contact with the active layer. The sealing members 28, 29 are adhered firmly to each of the planar electrode layers 22, 23 by a pressure-sensitive adhesive that forms a strong bond with the PET substrate 24, 25 facing outward from the functional film structure 20. Once positioned on the functional film 20, the sealing members 28, 29 are substantially "U" or "C" shaped, covering the entire edge region of the functional film 20. The adhesive-free region may not be in direct contact with the entire edge of the functional film.

Figure 3:
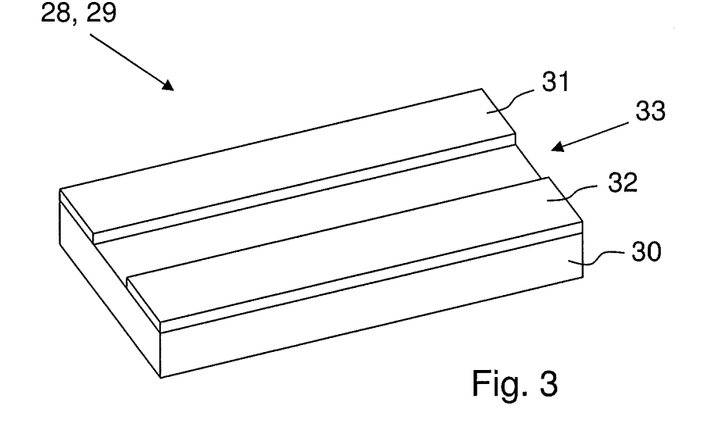
FIG. 3 is a schematic perspective view of a portion of a sealing member in accordance with the present invention.

The structure of the sealing members 28, 29 is shown in more detail in FIG. 3. FIG. 3 is a schematic perspective view of a portion of a sealing member in accordance with the present invention. In this figure, the sealing member 28, 29 is shown in an unbent configuration.

Two strips of adhesive 31, 32 are provided along the edges of the tape 30, clearly defining an adhesive-free region 33 into which the active layer 21 of the functional film 20 is placed. Each strip of adhesive material 31, 31 is a strip-like region having substantially constant width and running substantially parallel to one another. Other configurations of strip-like region may be used i.e. they may be non-parallel and not have straight edges.

Figure 4:
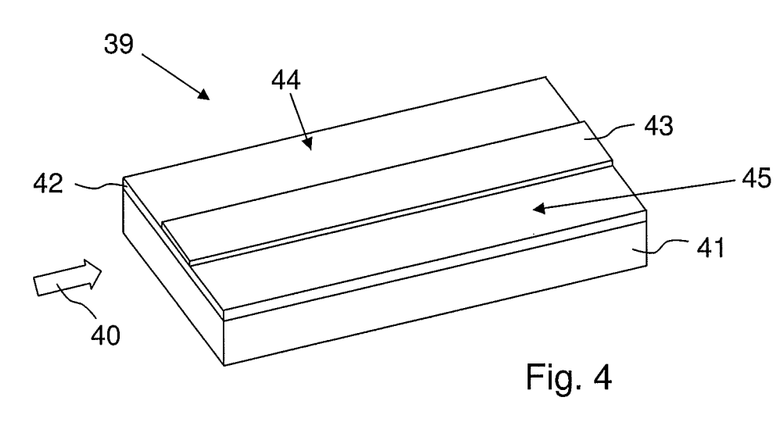
FIG. 4 is a schematic perspective view of a portion of another sealing member in accordance with the present invention.
Figure 5:
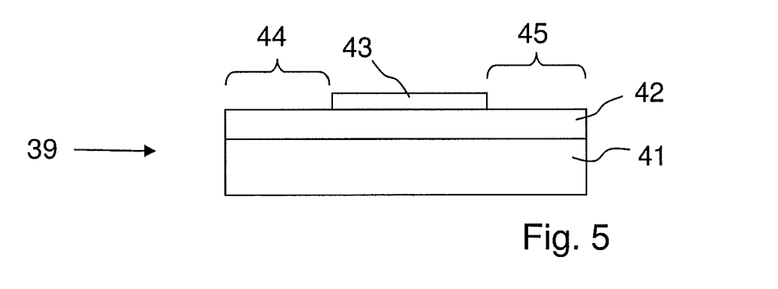
FIG. 5 is a cross sectional view of the sealing member shown in FIG. 4.

An alternative sealing member 39 is shown in FIG. 4 and FIG. 5. FIG. 4 is a schematic perspective view of a portion of sealing member 39 and FIG. 5 is a cross sectional view of the sealing member 39 viewed in the direction of arrow 40.

Sealing member 39 comprises a PET film 41 having a substantially continuous layer of adhesive 42 on a surface thereof. Positioned centrally along the length of the adhesive layer 42 is a narrow strip of PET film 43. The PET film 43 is physically separate from the PET film 41. The PET film 43 is an adhesive-free region that is between strip-like region of adhesive 44 and the strip-like region of adhesive 45. With this type of sealing member, the width of the adhesive-free region may be altered by selecting a different width for the PET film 43.

Figure 6:
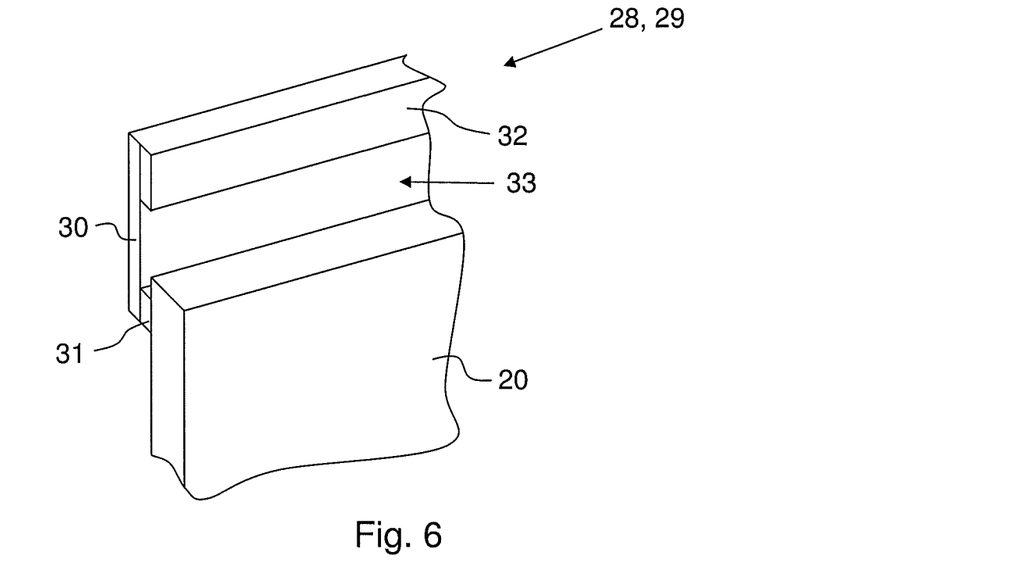
FIG. 6 is a schematic perspective view showing a first stage in the application process for a sealing member in accordance with the present invention.
Figure 7:
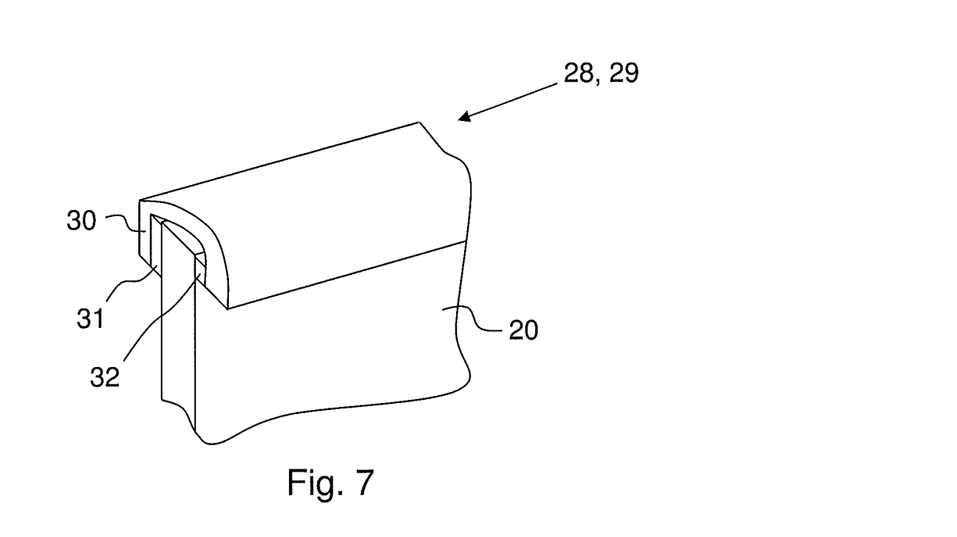
FIG. 7 is a schematic perspective view showing a second stage in the application process for a sealing member in accordance with the present invention.

The process of applying the sealing members 28, 29 is shown schematically in FIGS. 6 and 7. FIG. 6 is a schematic perspective view showing a first stage in the application process for a sealing member in accordance with the present invention. Initially, the sealing member 28, 29 is positioned along an exposed edge of the functional film 20, such that the adhesive-free region 33 of the tape 30 is aligned with the exposed edge of the active layer 21. Once in the correct position, the first adhesive strip 31 is placed in contact with the PET substrate 24 of a first planar electrode 22, such that the adhesive strip 31 bonds to the PET substrate 24.

FIG. 7 is a schematic perspective view showing a second stage in the application process for a sealing member in accordance with the present invention. Once the first adhesive strip 31 has bonded successfully with the PET substrate 24, the tape 30 is folded over the edge of the functional film 20 until the second adhesive strip 32 contacts the PET substrate 25 of the second planar electrode 23. Once in the correct position, the second adhesive strip 32 is bonded firmly to the PET substrate 25. The adhesive strips 31, 32 are not in contact with the active layer. There may be no contact between the adhesive-free region and the edge of the functional film 20.

The sealing member 39 may be applied in a similar manner.

Figure 8:
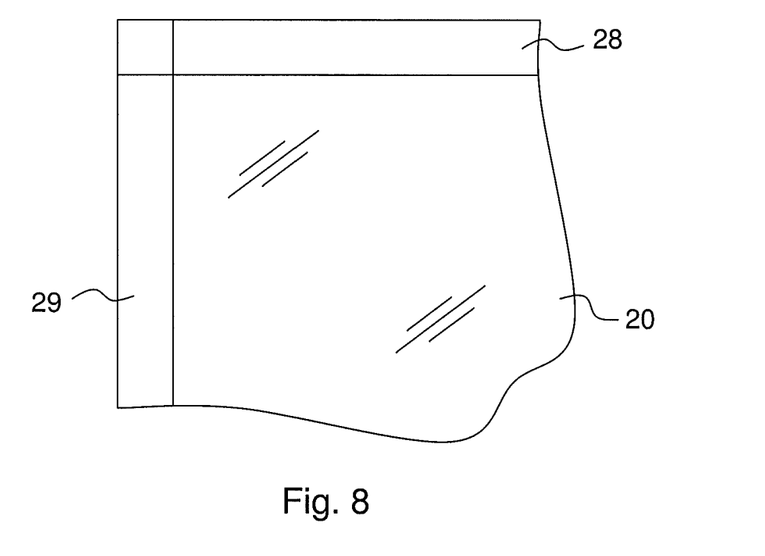
FIG. 8 is a schematic plan view of a corner region of a functional film showing a first sealing method.
Figure 9:
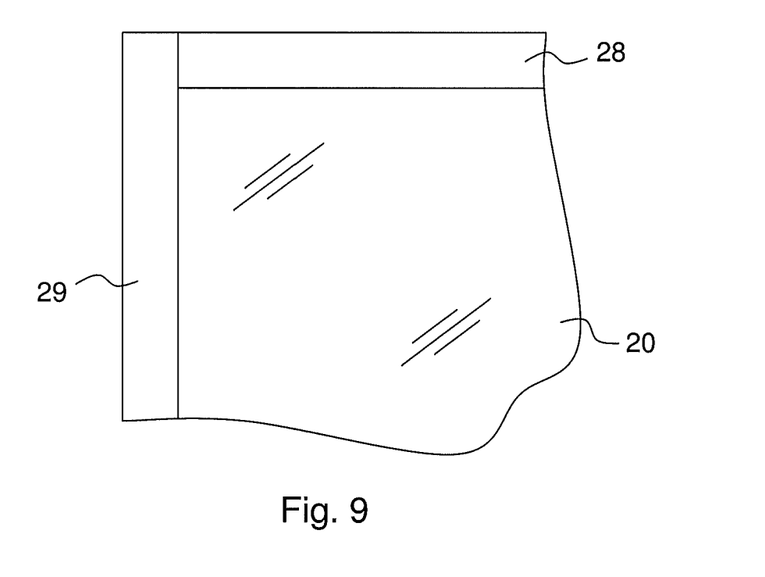
FIG. 9 is a schematic plan view of a corner region of a functional film showing a second sealing method.

At the corner regions of the functional film, two approaches to ensure that the functional film is securely sealed may be taken, as illustrated in FIGS. 8 and 9. FIG. 8 is a schematic plan view of a corner region of a functional film showing a first sealing method. At the corner of the functional film 20, the sealing member 28 positioned along a first edge of the functional film 20 extends along the entirety of that edge, being terminated at the apex of the corner. The sealing member 29 positioned along the second edge of the functional film 20, lying at 90° to the first edge, also extends along the entirety of the second edge of the functional film 20, being terminated at the apex of the corner. In this manner, a portion of the sealing members 28, 29 overlap in the corner region, providing a reinforced seal.

Alternatively, FIG. 9 shows a schematic plan view of a corner region of a functional film showing a second sealing method. In this situation, again at the corner of the functional film 20, the sealing member 28 positioned along a first edge of the functional film 20 extends along the entirety of that edge, being terminated at the apex of the corner. However, the second sealing member 29, whilst extending along substantially all of the second edge, lying at 90° to the first edge, is terminated short of the apex, at a length calculated to ensure that the end of the second sealing member 29 abuts the edge of the first sealing member 28. In this way, the additional thickness of the edge region to be accommodated within the laminated vehicle glazing is kept to a minimum. As an alternative, in the situation where the sealing members 28, 29 overlap, it may be preferable for one of the sealing members to terminate beyond the apex of the corner join, such that the end of one sealing member 28 extends beyond the main body of the other 29. This arrangement provides additional barrier protection.

The methods shown in FIGS. 8 and 9 may be used, with appropriately shaped termination regions, to provide sealing in corner regions where the join between the first and second edges is not 90°, but may be less than or greater than 90°. Both FIGS. 8 and 9 illustrate the situation where the edge of the functional film 20 is substantially straight. The situation where the edge of the functional film 20 is curved is shown in FIGS. 10 and 11.

Figure 10:
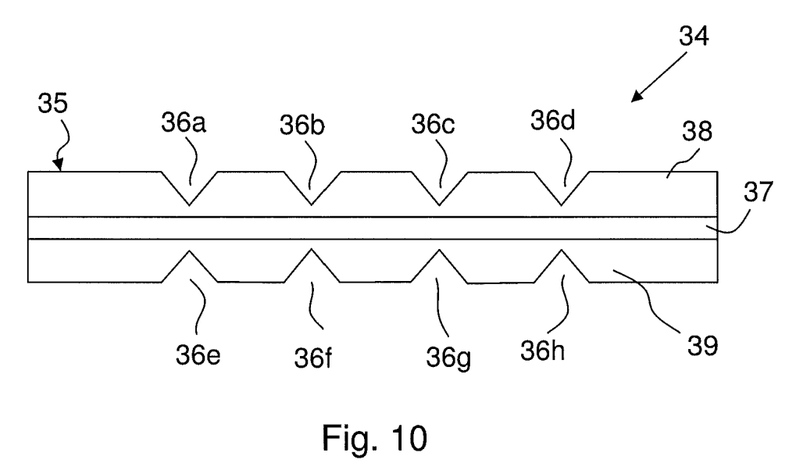
FIG. 10 is a schematic plan view of a sealing member adapted for a curved edge of a functional film.
Figure 11:
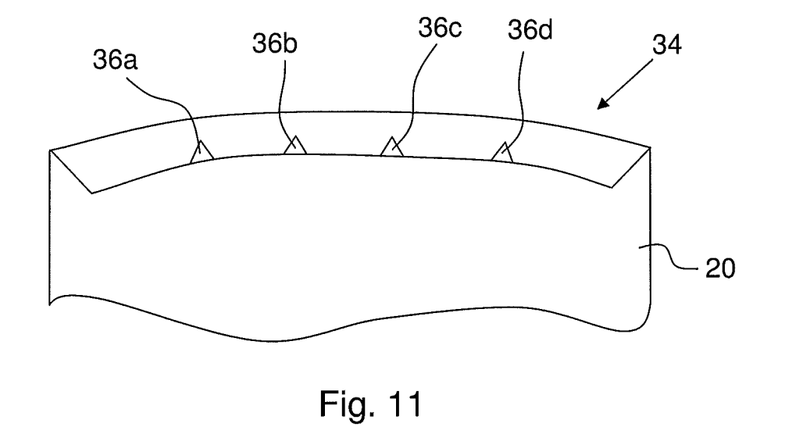
FIG. 11 is a schematic plan view of the sealing member of FIG. 10 in situ on a functional film.

FIG. 10 is a schematic plan view of a sealing member adapted for a curved edge of a functional film. The sealing member 34 is modified such that it no longer comprises a tape 35 with unbroken parallel edges. Instead, small "V"-shaped cuts 36a, 36b, 36c, 36d, 36e, 36f, 36g, 36h are provided along both edges, with the apex of each "V" stopping short of the central adhesive-free region 37. These "V"-shaped cuts enable the tape 35 to be positioned along a curved edge of a functional film 20 without any overlap of the tape, and preventing the addition of increased bulk and thickness to the sealing member 34 on lamination within a vehicle glazing. This is illustrated in FIG. 11, which shows a schematic plan view of the sealing member 34 of FIG. 10 in situ on a functional film. Here the edges of the "V"-shaped cuts 36a, 36b, 36c, 36d, 36e, 36f, 36g, 36h are positioned in close proximity to each other, due to the curvature of the tape 35 and hence the sealing member 34. The shape of the "V"-shaped cuts, their size and their spacing, may be modified depending upon the degree of curvature of the edge of the functional film 20. For example, "U"-shaped cuts may be preferred. However, it is desirable that the apex of any cut along the edge of the tape 35 should be located within the adhesive strip-like regions 38, 39, ensuring that the seal provided along the edge of the functional film 20 remains unbroken, and there is no opportunity for either material to escape from or enter into the active layer 21.

Figure 12:
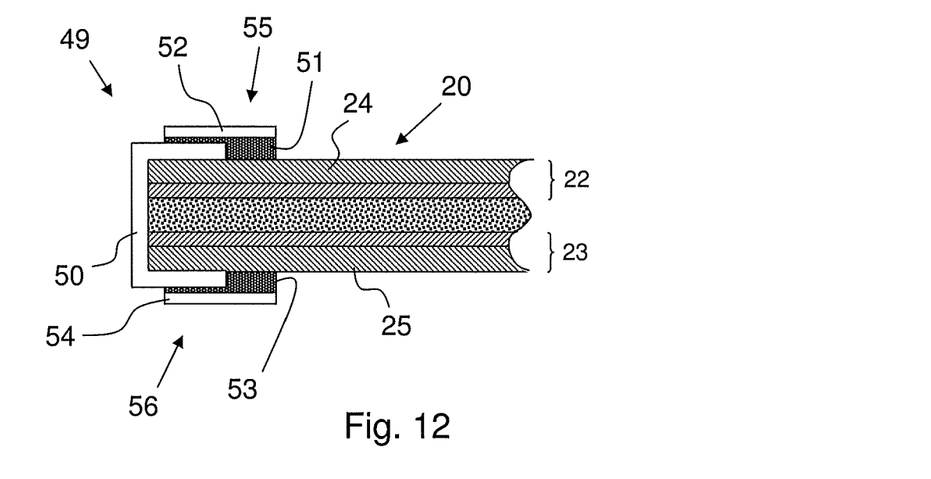
FIG. 12 is a schematic cross-section of a functional film having another type of sealing member in accordance with the present invention.

Another configuration of sealing member is shown in FIG. 12. FIG. 12 is a schematic cross-section of a functional film 20 having a sealing member 49 in accordance with the present invention. The functional film 20 is of the same type as described with reference to FIG. 2, although only the left hand side is shown. The sealing member 49 is shown in an "in-use" configuration, wherein the left edge of the functional film 20 is sealed. The sealing member 49 comprises a strip of PET film 50. The PET film has an exposed outer surface and an inner surface that faces the edge of the functional film 20. The surface of PET film 50 that faces the edge of the functional film 20 is an adhesive-free region.

The PET film 50 is joined to the PET substrate 24 via an adhesive tape 55. The adhesive tape 55 comprises a strip-like region of adhesive 51 supported on a support film 52 of PET. The strip-like region of adhesive 51 is adjacent a first edge of the PET film 50.

The PET film 50 is joined to the PET substrate 25 via an adhesive tape 56. The adhesive tape 56 comprises a strip-like region of adhesive 53 supported on a support film 54 of PET. The strip-like region of adhesive 53 is adjacent a second edge of the PET film 50.

The configuration of adhesive strip 31, 32 used with reference to FIG. 2 may be used to replace tape 55 or tape 56.

Figure 13:
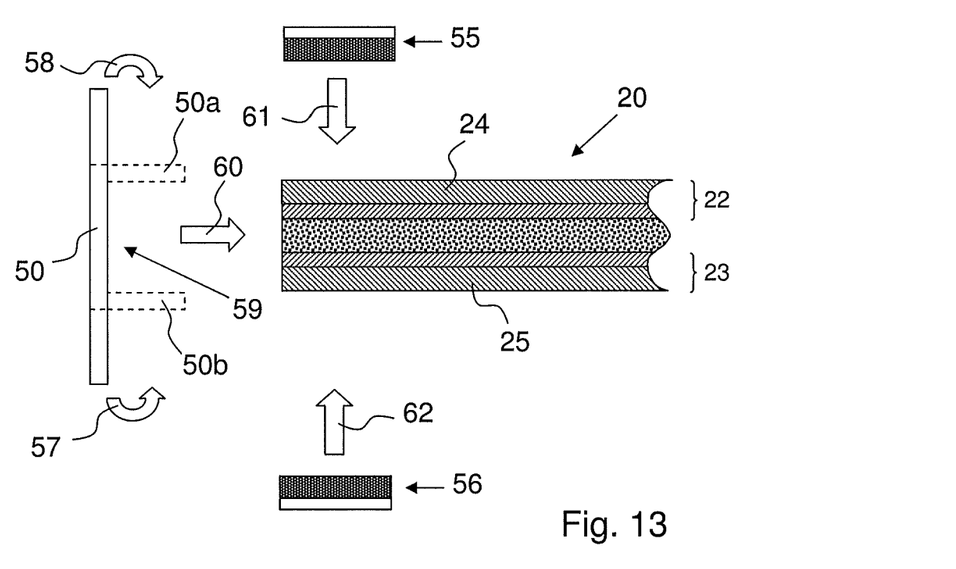
FIG. 13 is an exploded view of the FIG. 12.

FIG. 13 is an exploded view of FIG. 12, showing how the sealing member 49 is attached to the functional film 20. The initially unbent PET film 50 is bent in the direction of arrows 57 and 58 to provide a U-shaped channel (shown as dashed line portions 50a and 50b). The adhesive-free region 59 is moved towards the edge of the functional film 20 by moving the U-shaped channel of PET in the direction of arrow 60. The PET tape 50 may be bent after having been moved towards the edge of the functional film 20.

The portion 50a of PET tape 50 is joined to the PET substrate 24 by positioning tape 55 above the portion 50a and moving the tape in the direction of arrow 61. The strip-like region of adhesive 51, supported on support film 52, contacts the outer surface of the PET film 50 and the surface of the PET substrate 24, thereby joining the PET film 50 to the PET substrate 24.

Likewise, portion 50b of PET tape 50 is joined to the PET substrate 25 by positioning tape 56 below the portion 50b and moving the tape in the direction of arrow 62. The strip-like region of adhesive 53, supported on support film 54, contacts the outer surface of the PET film 50 and the surface of the PET substrate 25, thereby joining the PET film 50 to the PET substrate 24.

The resulting assembly is as shown in FIG. 12, wherein the functional film 20 has a sealed edge.

In order to determine whether the use of a tape as a sealing member provided a physical barrier suitable for use in a laminated vehicle glazing, samples were made using a tape product commercially available from Sellotape, available in the UK from HENKEL Consumer Adhesives. For these samples, the sealing members were prepared from the commercially available Sellotape® product, approximately 19 mm in width and 47 µm in thickness by placing a strip of PET tape, approximately 10 mm in width and 15 µm in thickness centrally along the Sellotape®. For an additional twelve samples, sealing members were prepared from commercially available riveter's tape, available from 3M Speciality Tapes and Adhesives in the UK. This tape had a PET film base, having a nominal thickness of 50 µm, and pressure sensitive adhesive strips along each edge, defining a central, adhesive-free region, having a nominal 20 µm thickness. The overall width of the tape was 26 mm, with each adhesive strip being 7 mm in width. Each sample comprised two plies of 2.1 mm thick clear glass, measuring 300×300 mm, two plies of 0.38 mm thick PVB interlayer material surrounding a single ply of 0.38 mm thick PVB interlayer material cut to receive an SPD functional film in the manner of a picture frame in a 240×240 mm inset square, and a 240×240 mm SPD functional film (having the general construction shown in FIG. 1). A bus bar was provided on an exposed ITO coated region on each of the planar electrode layers, to provide electrical current to the SPD functional film.

To seal the edge of the SPD functional film, the tape was placed along the edge of the functional film with the central PET region coincident with the edge of the active layer. The tape was folded over the edge of the active layer, and adhered to the exposed surface of the PET planar electrode layers. The samples were then laid up as follows: glass/0.38 mm PVB/0.38 mm picture frame PVB and SPD functional film/0.38 mm PVB/glass, and a laminated construction was made using suitable lamination conditions, typically involving autoclaving at suitably high temperature and pressure. Samples were produced containing both types of corner sealing method illustrated in FIGS. 8 and 9. In addition, tape was placed over the bus bars to ensure sealing in all regions of the edge region of the SPD functional film assembly.

Although the thickness of the commercially available product is greater than desirable, the test samples illustrated that the sealing members functioned to prevent ingress of plasticizer components from the PVB adhesive interlayer material, and also prevented any egress of SPD emulsion components out of the active layer. For the samples made using the commercially available Sellotape® product, compression of the film at the corner regions was evident by a change in the switching behaviour of the SPD functional film assembly, leading to dark regions appearing on switching. Of the samples made with riveter's tape, eleven switched successfully after processing, with faulty connections being responsible for the failure of the twelfth sample. The thickness of the sealing member may be selected such that there is little effect on the switching behaviour of the active layer or layers.

Bake testing was carried out on a previously produced batch of samples made using riveter's tape under the same processing conditions as described above. The samples made using riveter's tape, at 95° C. for 43, 331 and 496.5 hours. A slight change in switching behaviour was observed in regions where the film was compressed owing to the thickness of the tape, but no significant changes in switching behaviour were seen, unlike with unsealed SPD functional film assemblies.

In order to be used in a production laminated vehicle glazing, the sealing member preferably has a thickness in the range 12 and 50 µm, and preferably having a width in the range 10 to 30 mm. The central adhesive-free region preferably has a width in the range 3 to 20 mm. The sealing member may be formed from any suitable polymer material, but is preferably formed from PET. A pressure-sensitive adhesive is preferred, enabling easy manual or automated application, although any other suitable adhesive may be used.

The edge seals described herein may be used with other functional films having a similar construction.

The invention claimed is:

1. Functional film assembly comprising a functional film having at least one active layer laminated between first and second planar electrode layers, at least a portion of the edge region of the functional film being sealed by a sealing member, wherein the sealing member comprises a strip of polymer film material having on one surface a first strip-like region of adhesive material adjacent a first edge of the strip of polymer film material, and a second strip-like region of adhesive material adjacent a second edge of the strip of polymer film material, there being an adhesive-free region between the first strip-like region of adhesive material and the second strip-like region of adhesive material, and the adhesive-free region is positioned coincident with the active layer of the functional film.

2. Functional film assembly according to claim 1, wherein the first strip-like region of adhesive material is physically separate from the second strip-like region of adhesive material.

3. Functional film assembly according to claim 1, wherein the first strip-like region of adhesive material and the second strip-like region of adhesive material are substantially continuous and the adhesive-free region is physically separate from the strip of polymer film.

4. Functional film assembly according to claim 1, wherein the first strip-like region of adhesive material is supported on a first support film, and the strip of polymer film material is joined to the first planar electrode layer via the first strip-like region of adhesive material.

5. Functional film assembly according to claim 4, wherein the second strip-like region of adhesive material is supported on a second support film, and the strip of polymer film material is connected to the second planar electrode layer via the second strip-like region of adhesive material.

6. Functional film assembly as claimed in claim 1, wherein the first strip-like region of adhesive material contacts the first planar electrode layer of the functional film, and the second strip-like region of adhesive material contacts the second planar electrode layer.

7. Functional film assembly as claimed in claim 1, wherein the first and second strip-like regions of adhesive material are formed from a pressure-sensitive adhesive.

8. Functional film assembly as claimed in claim 1, wherein the active layer contains a suspended particle emulsion or a liquid crystal emulsion.

9. A laminated vehicle glazing comprising the functional film assembly of claim 1, laminated between a first and a second ply of a transparent glazing material by at least a first and a second ply of adhesive interlayer material.

10. The laminated vehicle glazing of claim 9, wherein the functional film is framed within a ply of adhesive interlayer material in an inset region, and laminated between the first and second plies of adhesive interlayer material.

11. The laminated glazing of claim 9, wherein the adhesive interlayer material is polyvinyl butyral.

12. Functional film assembly as claimed in claim 2, wherein the first strip-like region of adhesive material contacts the first planar electrode layer of the functional film, and the second strip-like region of adhesive material contacts the second planar electrode layer.

13. Functional film assembly as claimed in claim 3, wherein the first strip-like region of adhesive material contacts the first planar electrode layer of the functional film, and the second strip-like region of adhesive material contacts the second planar electrode layer.

14. Functional film assembly as claimed in claim 2, wherein the first and second strip-like regions of adhesive material are formed from a pressure-sensitive adhesive.

15. Functional film assembly as claimed in claim 3, wherein the first and second strip-like regions of adhesive material are formed from a pressure-sensitive adhesive.

16. Functional film assembly as claimed in claim 2, wherein the active layer contains a suspended particle emulsion or a liquid crystal emulsion.

17. Functional film assembly as claimed in claim 3, wherein the active layer contains a suspended particle emulsion or a liquid crystal emulsion.

18. A laminated vehicle glazing comprising the functional film assembly of claim 2, wherein the functional film assembly is laminated between a first and a second ply of a transparent glazing material by respective plies of adhesive interlayer material.

19. A laminated vehicle glazing comprising the functional film assembly of claim 3, wherein the functional film assembly is laminated between a first and a second ply of a transparent glazing material by respective plies of adhesive interlayer material.

* * * * *